US007641010B2

(12) United States Patent
Mizutani et al.

(10) Patent No.: US 7,641,010 B2
(45) Date of Patent: Jan. 5, 2010

(54) IN-WHEEL MOTOR WITH HIGH DURABILITY

(75) Inventors: Ryoji Mizutani, Nishikamo-gun (JP); Fumito Kurata, Nishikamo-gun (JP); Shigekazu Yogo, Nagoya (JP); Kenji Harada, Nishikamo (JP); Atsushi Torii, Nishio (JP); Yuki Tojima, Chita-gun (JP); Masafumi Sakuma, Chiryu (JP)

(73) Assignees: Toyota Jidosha Kabushiki Kaisha, Toyota-shi (JP); Aisin Seiki Kabushiki Kaisha, Kariya-shi (JP)

( * ) Notice: Subject to any disclaimer, the term of this patent is extended or adjusted under 35 U.S.C. 154(b) by 724 days.

(21) Appl. No.: 11/304,638

(22) Filed: Dec. 16, 2005

(65) Prior Publication Data

US 2006/0144626 A1    Jul. 6, 2006

(30) Foreign Application Priority Data

Jan. 6, 2005    (JP)    ............................ 2005-001801

(51) Int. Cl.
    *B60K 1/00*    (2006.01)
(52) U.S. Cl. .................. 180/65.51; 180/65.1; 180/65.6
(58) Field of Classification Search ............. 180/65.51, 180/65.6, 242, 243
    See application file for complete search history.

(56) References Cited

U.S. PATENT DOCUMENTS

| 4,049,098 | A | * | 9/1977 | Kita et al. ................. 192/223.3 |
| 4,674,992 | A | * | 6/1987 | Carmillet et al. ............ 464/68.1 |
| 4,697,694 | A | * | 10/1987 | Huber ......................... 198/782 |
| 4,799,564 | A | * | 1/1989 | Iijima et al. .............. 180/65.51 |
| 4,872,394 | A | * | 10/1989 | Nakagawa et al. ............. 91/506 |
| 5,713,247 | A | * | 2/1998 | Skelton et al. ................. 74/607 |
| 6,328,667 | B1 | * | 12/2001 | Otaki et al. .................... 475/84 |
| 7,249,644 | B2 | * | 7/2007 | Honda et al. ............. 180/65.51 |
| 7,350,606 | B2 | * | 4/2008 | Brill et al. ................ 180/65.51 |
| 7,351,178 | B2 | * | 4/2008 | Keuth .......................... 475/204 |
| 7,392,995 | B2 | * | 7/2008 | Lin .......................... 280/47.31 |
| 2004/0080223 | A1 | | 4/2004 | Shimizu |
| 2004/0094928 | A1 | | 5/2004 | Amanuma |
| 2004/0163863 | A1 | * | 8/2004 | Beck et al. ................. 180/65.5 |
| 2005/0056471 | A1 | * | 3/2005 | Kurata ....................... 180/65.5 |

(Continued)

FOREIGN PATENT DOCUMENTS

CN    1424970    6/2003

(Continued)

OTHER PUBLICATIONS

German Language Version of German Office Action, Appln. No. 10 2006 000 908.8-22 dated May 18, 2007.

(Continued)

*Primary Examiner*—Glenn Dayoan
*Assistant Examiner*—Vaughn T Coolman
(74) *Attorney, Agent, or Firm*—Kenyon & Kenyon LLP

(57) ABSTRACT

An in-wheel motor includes a motor generating motive power, a planetary gear arranged toward a wheel disc relative to the motor to reduce an output of the motor, and a shaft arranged toward the wheel disc relative to the planetary gear and connected to a planetary carrier. Shaft is connected to a constant velocity joint transmitting the motive power to wheel disc.

3 Claims, 3 Drawing Sheets

U.S. PATENT DOCUMENTS

2005/0247496 A1 * 11/2005 Nagaya .................... 180/65.5

FOREIGN PATENT DOCUMENTS

| DE | 10101669 | 8/2002 |
|---|---|---|
| DE | 10204915 | 9/2003 |
| JP | 05-169991 A | 7/1993 |
| JP | 10-042518 A | 2/1998 |
| JP | 2004-168211 A | 6/2004 |
| JP | 2004338487 | 12/2004 |
| JP | 2005-022554 | 1/2005 |
| JP | 2005-104166 | 4/2005 |
| WO | WO 02/083446 A1 | 10/2002 |
| WO | WO 2005110796 | 11/2005 |

OTHER PUBLICATIONS

German Translation of German Office Action, Appln. No. 10 2006 000 908.8-22 dated May 18, 2007.

Go Nagaya et al.: "Development of an In-Wheel Motor with Advanced Deynamic-Damper Mechanism (20025544)", The Society of Automotive Engineers of Japan, Nov. 26, 2002.

Chinese Language Office Action, Appln. No. 2006 100003768, Sep. 21, 2007.

* cited by examiner

IN-WHEEL MOTOR WITH HIGH DURABILITY

This nonprovisional application is based on Japanese Patent Application No. 2005-001801 filed with the Japan Patent Office on Jan. 6, 2005, the entire contents of which are hereby incorporated by reference.

BACKGROUND OF THE INVENTION

1. Field of the Invention

The present invention relates to an in-wheel motor, and particularly, to an in-wheel motor with high durability.

2. Description of the Background Art

A known conventional in-wheel motor drive scheme is to support a hollow motor by a motor suspension (for example, see WO02/083446 and Go Nagaya, Yasumichi Wakao and Akihiko Abe "Development of an In-Wheel Motor with Advanced Dynamic-Damper Mechanism", the society of automotive engineers of Japan, Nov. 26, 2002, proceedings of conference No. 83-02, pp. 9-12). The hollow motor is coupled to a wheel of a wheel unit to rotate the wheel. The hollow motor is supported by the motor suspension so that it can vibrate in the vertical direction of the vehicle, and thus separated from the unsprung weight. The wheel is supported by a suspension arm to the vehicle. In this in-wheel motor drive scheme, when the wheel unit vibrates, the hollow motor receives the vibration of the wheel unit through the wheel and vibrates in the vertical direction of the vehicle. The vibration of the hollow motor cancels unsprung vibration.

Meanwhile, in order not to increase the volume of a motor, it is desirable to transmit output torque of the motor via a speed reducer to a wheel.

Accordingly, in a conventional in-wheel motor drive scheme, a geared motor is employed as the in-wheel motor, in which a hollow inner rotor type motor (motor) and a planetary speed reducer are integrally assembled in a motor case.

Specifically, the motor of the geared motor is a hollow inner rotor type motor, which includes a stator fixed to a non-rotary case provided on the outer side in the radial direction and a rotor fixed to a rotary case provided on the inner side in the radial direction. The non-rotary case is coupled to a knuckle that is a fixed portion, while the rotary case is coupled to a sun gear of the planetary speed reducer and rotatably connected to the shaft portion of the motor case.

When the sun gear rotates as the rotor rotates, the rotation speed of the sun gear is converted and reduced to a speed corresponding to the orbital period of the planetary gear, and transmitted from a carrier to the shaft coupled to the output shaft of the speed reducer. The shaft has a universal joint coupling the output shaft of the planetary speed reducer and the wheel.

The geared motor is float-mounted to unsprung weight corresponding components that are a components around each wheel, and the rotation axis of the motor can swing in the radial direction independently of the rotation axis of the wheel unit. Thus, the mass of the motor functions as the mass of a so-called dynamic damper to cancel unsprung vibration when the vehicle runs over a bad road. As a result, the riding comfort of the vehicle is improved.

Here, the motor and the planetary speed reducer in a conventional geared motor are arranged in the following order from the wheel toward the vehicle body: the universal joint, the motor, and the planetary speed reducer. Then, the vibration of the wheel unit is transmitted, via the wheel and the universal joint, from the motor to the planetary speed reducer. Here, stress due to vibration of the wheel unit is applied to each of the motor and the planetary speed reducer. As this stress is greater proportionate to the distance from the wheel unit that is the source of vibration, a relatively great stress is applied to the planetary speed reducer that is located farthest from the wheel unit.

As known well, the planetary speed reducer has a structure where a plurality of gears are engaged, and hence stiffness thereof to the stress is relatively low. Accordingly, there has been a problem with the conventional in-wheel motor drive scheme that the durability of the in-wheel motor is impaired.

SUMMARY OF THE INVENTION

An object of the present invention is to provide an in-wheel motor with high durability.

According to the present invention, an in-wheel motor is provided. The in-wheel motor includes: an electric motor generating motive power; a speed reducer arranged toward a wheel relative to the electric motor to reduce an output of the electric motor; and a rotation shaft arranged toward the wheel relative to the speed reducer to transmit an output of the speed reducer to the wheel. The rotation shaft is connected to a motive power transmission mechanism transmitting the motive power to the wheel.

Preferably, the speed reducer is formed by a planetary gear mechanism. The planetary gear mechanism includes a sun gear coupled to a rotor of the electric motor, a pinion gear arranged to engage with the sun gear, a planetary carrier that is coupled to the pinion gear and that is connected to the rotation shaft, and a ring gear that is non-rotatably fixed.

Preferably, the in-wheel motor further includes a case accommodating the electric motor and the speed reducer. The case includes a first case arranged toward a vehicle body to fix the electric motor and the speed reducer, and a second case arranged toward the wheel to be coupled to the first case at a face perpendicular to the rotation shaft. The second case abuts to an end face, perpendicular to the rotation shaft, of the speed reducer to fix the speed reducer in the rotation shaft direction.

Preferably, said second case abuts to an end face, perpendicular to said rotation shaft, of said ring gear.

According to the present invention, durability of the in-wheel motor can be improved.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
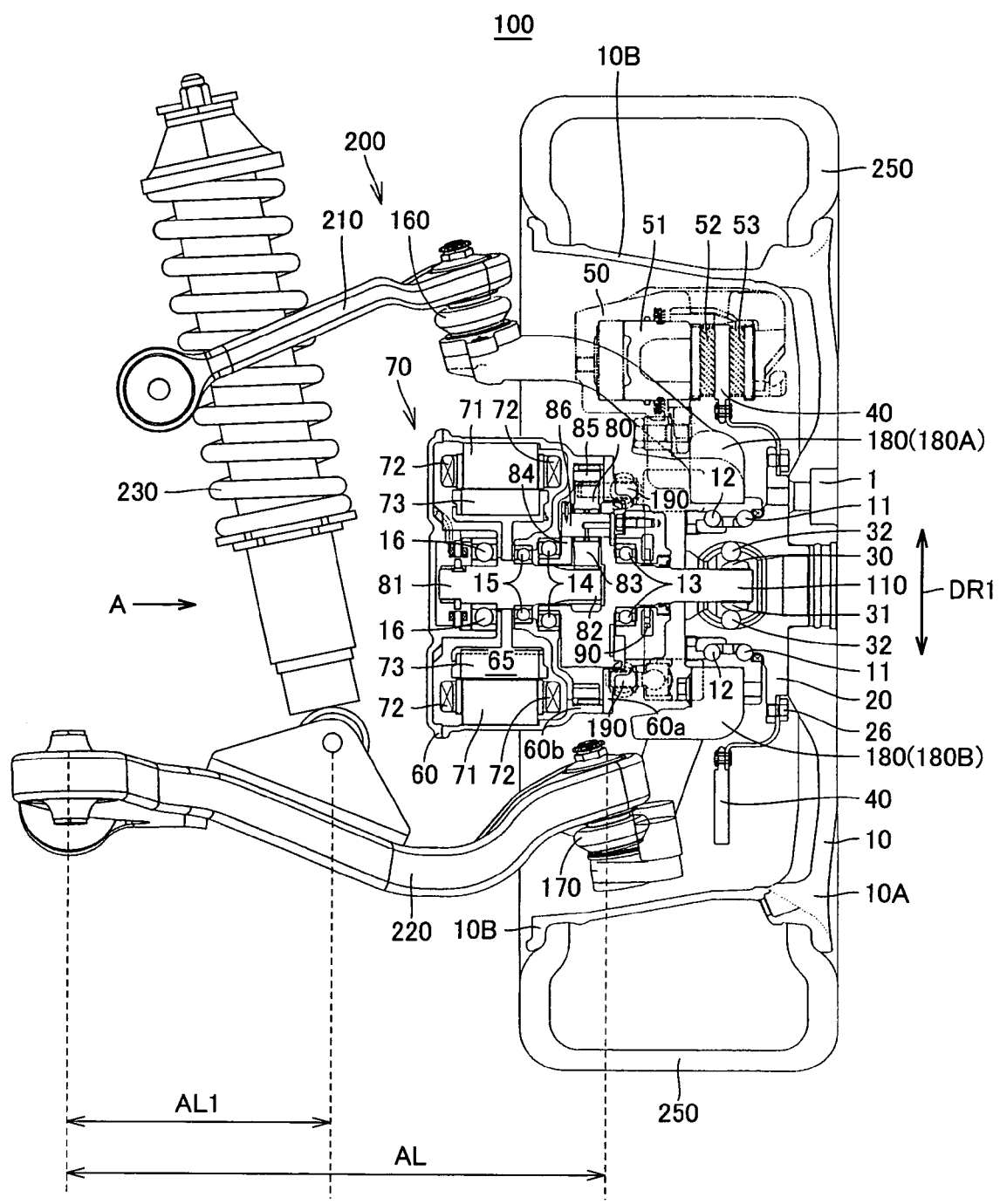
FIG. 1 is a schematic cross-sectional view of a motor-driven wheel including an in-wheel motor according to an embodiment of the present invention and a wheel supporting apparatus supporting the motor-driven wheel.

Referring to the drawings, an embodiment of the present invention will be described in detail. In the drawings, the same or corresponding parts are denoted by the same reference character, and description thereof will not be repeated.

FIG. 1 is a schematic cross-sectional view of a motor-driven wheel including an in-wheel motor according to an embodiment of the present invention and a wheel supporting apparatus supporting the motor-driven wheel.

Referring to FIG. 1, a motor-driven wheel 100 includes a wheel disc 10, a wheel hub 20, a constant velocity joint 30, a brake rotor 40, a brake caliper 50, an in-wheel motor 70, and a tire 250.

In-wheel motor 70 has a case 60 and a shaft 110. In-wheel motor 70 further includes a motor 65, a planetary gear 80, an oil pump 90, a shaft 110, and an oil passage (not shown).

Wheel supporting apparatus 200 includes a dynamic mass damper mechanism (not shown), ball joints 160, 170, knuckles 180, torque rods 190, an upper arm 210, a lower arm 220, and a shock absorber 230.

Wheel disc 10 has a substantially cup-like shape, and formed by a disc portion 10A and a rim portion 10B. Wheel disc 10 may accommodate wheel hub 20, brake rotor 40, brake caliper 50, and in-wheel motor 70. By fastening disc portion 10A to wheel hub 20 with a bolt or a nut (not shown) at a wheel mounting portion 1, wheel disc 10 is coupled to wheel hub 20. Wheel hub 20 accommodates constant velocity joint 30, and coupled to shaft 110 via the accommodated constant velocity joint 30. Wheel hub 20 is rotatably supported to knuckles 180 by hub bearings 11, 12. Tire 250 is fixed to the outer periphery of rim portion 10B of wheel disc 10.

Constant velocity joint 30 includes an inner 31 and a ball 32. Inner 31 is fitted to shaft 110. Ball 32 is engaged with a groove of wheel hub 20 and a groove of inner 31 provided in the direction of the rotation shaft of shaft 110, and rotates wheel hub 20 in accordance with the rotation of shaft 110. Ball 32 can move in the direction of the rotation shaft of shaft 110 along the grooves provided to wheel hub 20 and inner 31. It is noted that constant velocity joint 30 is not specifically limited so long as it is a motive power transmission mechanism that transmits motive power of in-wheel motor 70 to wheel disc 10. For example, a so-called flexible coupling may be employed as the motive power transmission mechanism, where a plurality of discs and the like are employed so that the in-wheel motor side and the wheel motor side are coupled to be eccentric to any directions.

Brake rotor 40 has its inner periphery fixed to the outer periphery of wheel hub 20 by bolts 24, 26, and has its outer periphery arranged to pass through brake caliper 50. Brake caliper 50 is fixed to knuckle 180. Brake caliper 50 includes a brake piston 51, and brake pads 52, 53. The outer periphery of brake rotor 40 is interposed between brake pads 52, 53.

When brake oil is supplied from an opening 50A, brake piston 51 moves toward the right side in FIG. 1, to push brake pad 52 right on the drawing. When brake pad 52 moves right on the drawing by brake piston 51, brake pad 53 moves left on the drawing in response. Thus, the outer periphery of brake rotor 40 is pinched by brake pads 52, 53, and brake is applied to motor-driven wheel 100.

Case 60 is arranged on the left of wheel hub 20 in FIG. 1. Case 60 includes a case 60a and a case 60b. Case 60a has a substantially L shape, and case 60c has a substantially inverted C shape. Case 60a is arranged toward wheel disc 10, while case 60b is arranged toward the vehicle body. Case 60a and case 60b are coupled to each other by a not-shown screw, at faces perpendicular to the direction of the rotation shaft of shaft 110. Case 60a accommodates oil pump 90, shaft 110, and the oil passage. Case 60b accommodates motor 65 and planetary gear 80.

Motor 65 includes a stator core 71, a stator coil 72 and a rotor 73. Stator core 71 is fixed to case 60b. Stator coil 72 is wrapped around stator core 71. When motor 65 is a three-phase motor, stator coil 72 is formed by a U-phase coil, a V-phase coil, and a W-phase coil. Rotor 73 is arranged toward the inner circumference of stator core 71 and stator coil 72.

Planetary gear 80 includes a sun gear shaft 81, a sun gear 82, a pinion gear 83, a planetary carrier 84, a ring gear 85, and a pin 86. Sun gear shaft 81 is coupled to rotor 73 of motor 65. Sun gear 81 is rotatably supported by bearings 15, 16. Sun gear 82 is coupled to sun gear shaft 81.

Pinion gear 83 engages with sun gear 82, and rotatably supported by the bearings arranged at the outer circumference of pin 86. Planetary carrier 84 is coupled to pinion gear 83, and connected to shaft 110. Planetary carrier 84 and shaft 110 connected to planetary carrier 84 are rotatably supported by bearings 13, 14. Ring gear 85 is fixed to case 60b. Here, ring gear 85 is fixed to case 60b so that an end face of the rotation shaft direction of shaft 110 abuts to case 60a, as will be described later. Pin 86 is supported by planetary carrier 84.

Oil pump 90 is provided at an end of in-wheel motor 70 toward wheel hub 20, as connected to shaft 110. As described above, shaft 110 is connected to inner 31 of constant velocity joint 30 and planetary carrier 84, and rotatably supported by bearings 13, 14.

The oil passage is provided to case 60. The oil passage has its one end coupled to oil pump 90, and has its other end inserted into an oil reservoir (not shown).

Oil pump 90 pumps up the oil accumulated in the oil reservoir with the rotation of shaft 110, and circulates the pumped up oil in case 60.

Knuckle 180 (180a) has its one end coupled to ball joint 160, and has its other end coupled to wheel hub 20 via hub bearings 11, 12. Knuckle 180 (180b) has its one end fixed to a plate (not shown) by a bolt, and has its other end coupled to wheel hub 20 via hub bearings 11, 12. The plate is coupled to ball joint 170. Thus, knuckles 180 rotatably support wheel hub 20 and wheel disc 10.

Torque rod 190 (190a) has its one end coupled to case 60, and has its other end coupled to knuckle 180 (180a). Torque rod 190 (190b) has its one end coupled to case 60, and has its other end coupled to knuckle 180 (180b).

Upper arm 210 and lower arm 220 are arranged in vertical direction DR1 of the vehicle body. Upper arm 210 has its one end coupled to ball joint 160, and has its other end coupled to the vehicle body to be rotatable in vertical direction DR1 of the vehicle body. Lower arm 220 has its one end coupled to ball joint 170, and has its other end coupled to the vehicle body to be rotatable in vertical direction DR1 of the vehicle body. Further, lower arm 220 is coupled to the vehicle body via shock absorber 230. Thus, motor-driven wheel 100 is suspended on the vehicle body.

As upper arm 210 and lower arm 220 are rotatably fixed to the vehicle body in vertical direction DR1 of the vehicle body and lower arm 220 is coupled to the vehicle body via shock absorber 230, upper arm 210, lower arm 220 and shock absorber 230 function as a suspension. Upper arm 210 and lower arm 220 constitute "suspension arms".

Figure 2:
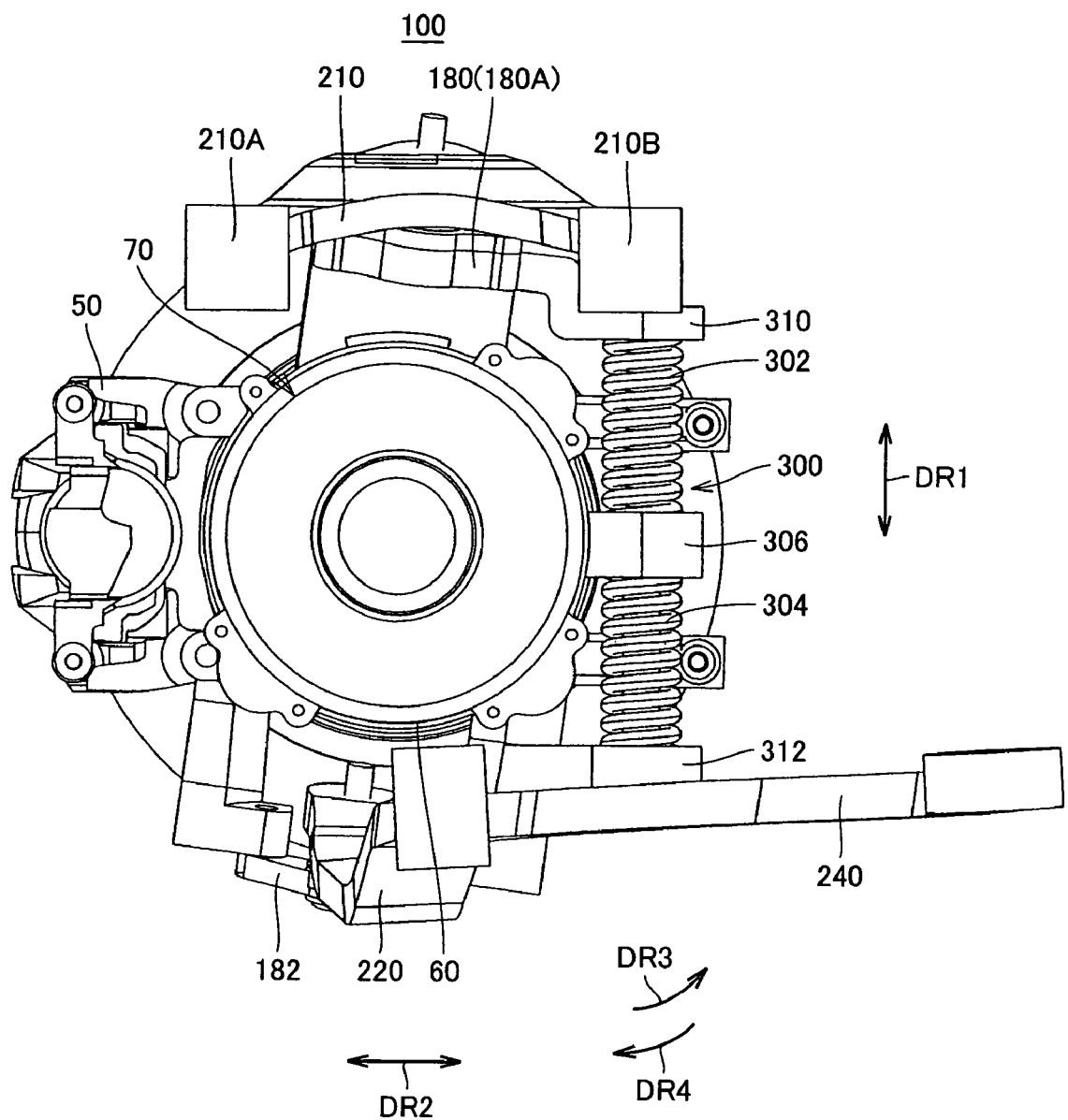
FIG. 2 is a plan view of the motor-driven wheel and the wheel supporting apparatus seen from direction A shown in FIG. 1.

FIG. 2 is a plan view of motor-driven wheel 100 and wheel supporting apparatus 200 seen from direction A shown in FIG. 1.

Referring to FIG. 2, upper arm 210 has two ends 210A, 210B, and fixed to the vehicle body by ends 210A, 210B to be rotatable in vertical direction DR1 of the vehicle body. Lower arm 220 has an end 220A, by which lower arm 220 is fixed to the vehicle body to be rotatable in vertical direction DR1 of the vehicle body.

Link 240 has its one end coupled to ball joint 170 (not shown). In accordance with the rotation force from the steering (handle) of the vehicle body, link 240 rotates motor-driven wheel 100 right or left relative to the traveling direction of the vehicle.

Dynamic mass damper mechanism 300 is constituted by springs 302, 304 that are a pair of elastic members provided in vertical direction DR1 of the vehicle body. A center portion 306 of dynamic mass damper 300 is attached to the outer circumferential face of case 60 of in-wheel motor 70. An upper portion 310 of dynamic mass damper mechanism 300 is connected to knuckle 180 (180A). Upper portion 310 and center portion 306 are connected via spring 302. Lower portion 312 of dynamic mass damper mechanism 300 is connected to knuckle 180 (180B). Center portion 306 and lower portion 312 are connected via spring 304.

An absorber (not shown) penetrating through center portion 306 is provided to upper portion 310 and lower portion 312. The absorber has its one end fixed to center portion 306 and includes a shaft (not shown) that vibrates in the vertical direction in accordance with compression/expansion of springs 302, 304. The absorber dampers the vibration of the shaft in the vertical direction.

Wheel supporting apparatus 200 fixes dynamic mass damper mechanism 300 to case 60 of in-wheel motor 70, and couples the suspension arms (upper arm 210 and lower arm 220) to knuckle 180 and dynamic mass damper mechanism 400 by ball joints 160, 170, and thereby supports motor-driven wheel 100 to the vehicle body.

Specifically, wheel supporting apparatus 200 rotatably supports wheel disc 10 and wheel hub 20 by upper arm 210, lower arm 220 and knuckle 180, and supports in-wheel motor 70 by upper arm 210, lower arm 220 and dynamic mass damper mechanism 300 so as to allow vibration in vertical direction DR1 of the vehicle body.

When motor-driven wheel 100 rotates in rotation direction DR3 during traveling of the vehicle, in-wheel motor 70 rotates in rotation direction DR4. Then, torque rod 190 suppresses rotation of in-wheel motor 70 generated by rotation of motor-driven wheel 100.

Referring back to FIG. 1, when an alternating current is supplied to stator coil 72 by a switching circuit (not shown) incorporated into the vehicle, rotor 73 rotates, and motor 65 outputs prescribed torque. Then, the output torque of motor 65 is transmitted to planetary gear 80 via sun gear shaft 81. Planetary gear 80 changes the output torque from sun gear shaft 81 by sun gear 82 and pinion gear 83, i.e., changes the speed (reduces the speed) and provides it to planetary carrier 84. Planetary carrier 84 transmits the output torque of planetary gear 80 to shaft 110, and shaft 110 rotates wheel hub 20 and wheel disc 10 by a prescribed rotation number via constant velocity joint 30. Thus, motor-driven wheel 100 rotates by a prescribed rotation number, and the vehicle travels.

When motor-driven wheel 100 receives vibration in vertical direction DR1 of the vehicle body during traveling of the vehicle due to the condition of the road and the like, springs 302, 304 of dynamic mass damper mechanism 300 compress/expand in vertical direction DR1 of the vehicle by in-wheel motor 70 that serves as the damper mass. By compression/expansion of springs 302, 304, vibration in vertical direction DR1 of in-wheel motor 70 is generated, which is out of phase relative to vibration due to force from the road surface to motor-driven wheel 100. Specifically, dynamic damper mechanism 300 converts the vibration of motor-driven wheel 100 into the vibration of in-wheel motor 70. Here, to the vehicle body, vibration is transmitted that is the combination of the vibration of motor-driven wheel 100 and the vibration of in-wheel motor 70 that is out of phase relative to that of motor-driven wheel 100. As the vibration of motor-driven wheel 100 and that of in-wheel motor 70 are out of phase, an amplitude of the vibration of motor-driven wheel 100 is reduced by that of the vibration of in-wheel motor 70 that is out of phase. Specifically, the vibration of motor-driven wheel 100 is cancelled by the vibration of in-wheel motor 70, and hardly transmitted to the vehicle body via upper arm 210 and lower arm 220.

In-wheel motor 70 vibrates in vertical direction DR1 of the vehicle body via constant velocity joint 30. Specifically, in-wheel motor 70 vibrates arcing in vertical direction DR1 of the vehicle around constant velocity joint 30. The vibration in vertical direction DR1 of in-wheel motor 70 is damped by the absorber.

Thus, an unsprung input from tire 250 is alleviated. Specifically, when motor-driven wheel 100 receives vibration due to the condition of the road surface and the like, vibration that cannot be covered by shock absorber 230 is absorbed by dynamic mass damper mechanism 300. Dynamic mass damper mechanism 300 allows in-wheel motor 70 to vibrate by vibration received by motor-driven wheel 100 in vertical direction DR1 of the vehicle body with a different phase. As a result, dynamic mass damper mechanism 300 does not transmit great vibration to the sprung vehicle body. Accordingly, the riding comfort of the vehicle incorporating the wheel driven by in-wheel motor 70 is improved.

It is noted that in-wheel motor 70 according to the present embodiment of the present invention has the following three characteristics. With these characteristics, in-wheel motor 70 is improved in its durability and reduced in size and weight. Additionally, the riding comfort of the vehicle incorporating in-wheel motor 70 is improved.

Firstly, in-wheel motor 70 is characterized in the function of shaft 110. Specifically, shaft 110 functions to support in-wheel motor 70 vibrating in vertical direction DR1 of the vehicle body, allowing in-wheel motor 70 to pivot around the portion connecting shaft 110 and constant velocity joint 30. Also, shaft 110 functions to transmit the output torque of motor 65, which has its speed reduced by planetary gear 80 and thus increased in torque, to wheel disc 10 via constant velocity joint 30.

Here, when in-wheel motor 70 vibrates in vertical direction DR1 of the vehicle body in accordance with vibration of motor-driven wheel 100, bending moment that effects in vertical direction DR1 of the vehicle body is generated in shaft 110. Thus, shaft 110 is required to have high strength as a supporting member of in-wheel motor 70.

Further, as shaft 110 is connected to planetary carrier 84 to transmit the output torque of motor 65 that has been converted to high torque, shaft 110 is required to have high strength as a motive power transmission member. Thus, shaft 110 is required to have high strength as the supporting member of in-wheel motor 70 and as the motive power transmission member. According to the present invention, two members each required to have high strength can be integrated into a single shaft 110. Thus, components required to have high strength can be unified to reduce in-wheel motor 70 in size and weight.

Secondly, in-wheel motor 70 is characterized in its arrangement as to motor 65 and planetary gear 80 accommodated in case 60b. Specifically, inside case 60b, planetary gear 80 is arranged toward wheel disc 10 relative to motor 65. Then, planetary gear 80 has planetary carrier 84 connected to shaft 110. Further, shaft 110 is fitted to inner 31 of constant velocity joint 30. Thus, in in-wheel motor 70, motor 65 and planetary gear 80 are arranged in the following order, from the vehicle body side toward the wheel disc 10 side: motor 65, planetary gear 80, and constant velocity joint 30.

When unexpected external force is applied to motor-driven wheel 100, in-wheel motor 70 vibrates greatly. When in-wheel motor 70 vibrates greatly, stress due to the vibration is applied also to motor 65 and planetary gear 80 accommodated as integrated in case 60b. Here, in-wheel motor 70 vibrates to arc around constant velocity joint 30, and therefore the magnitude of the stress applied to motor 65 and planetary gear 80 increases proportionally to the distance from constant velocity joint 30.

It is noted that, in a conventional in-wheel motor, as the planetary gear is arranged toward the vehicle body than the motor is arranged, the stress applied to the planetary gear is greater than that applied to the motor. On the other hand, as the planetary gear has a structure in which a plurality of gears are engaged, it is lower than the motor in durability against the stress. Accordingly, there has been a problem with the conventional in-wheel motor that the durability is impaired.

In contrast, in in-wheel motor 70 of the present invention, planetary gear 80 is arranged toward wheel disc 10 relative to motor 65. Thus, planetary gear 80 is arranged in a position in the rotation shaft direction that is closer to constant velocity joint 30 as compared to the conventional planetary gear, and therefore the stress applied to planetary gear 80 is reduced. Accordingly, durability of in-wheel motor 70 is improved.

Thirdly, in-wheel motor 70 is characterized in its fixing method to case 60 of planetary gear 80.

Figure 3:
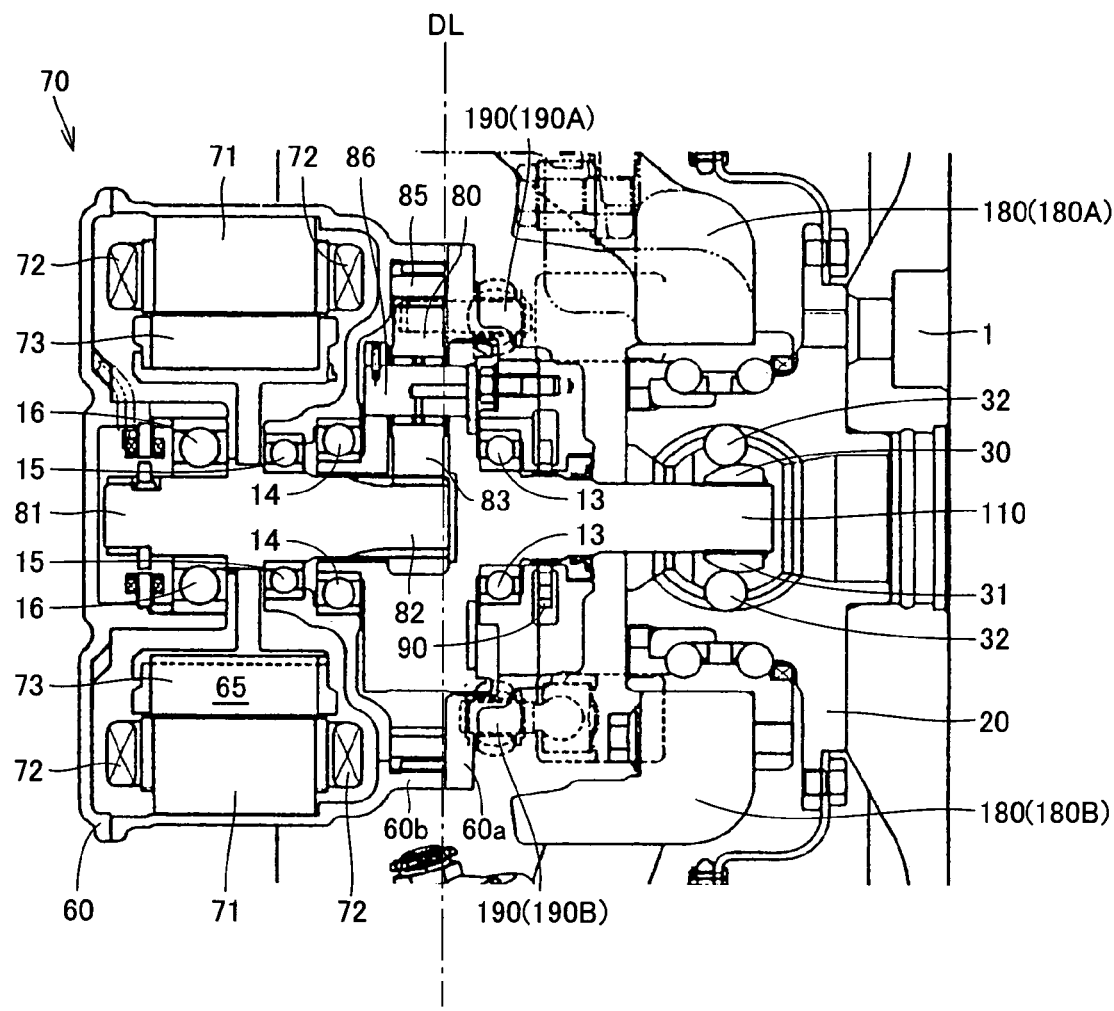
FIG. 3 is an enlarged view of the in-wheel motor shown in FIG. 1.

FIG. 3 is an enlarged view of in-wheel motor 70 shown in FIG. 1.

Referring to FIG. 3, planetary gear 80 is accommodated in case 60b with motor 65. Here, ring gear 85 located at the outermost circumference of planetary gear 80 is fixed so that its side face in the rotation shaft direction abuts to the inner face of case 60b.

Then, case 60a and case 60b are coupled at faces perpendicular to the rotation shaft direction of shaft 110. A dot-and-dashed line DL in the drawing shows a junction plane between case 60a and case 60b. Here, ring gear 85 is fixed to case 60b so that its end face perpendicular to the rotation shaft direction abuts to an end face perpendicular to the rotation shaft direction of case 60a. Thus, ring gear 85 has its rotation shaft direction position fixed by case 60a.

Normally, in order to regulate positional displacement in the rotation shaft direction of motor components due to inertial force in the rotation shaft direction, a snap ring is employed in assembling the motor components. For example, when a snap ring is employed to fix ring gear 85 to case 60b, a groove for fitting the snap ring is provided in advance to the inner circumferential face of case 60b, and the snap ring is fitted therein. Then, by assembling ring gear 85 to abut to the snap ring, ring gear 85 is fixed to case 60b so that the rotation shaft direction position is fixed.

However, such a fixing method requires an allowance in the length of the rotation shaft direction of case 60b so that the groove for assembling the snap ring is provided. Therefore, the length of case 60b is increased in the rotation shaft direction, and thus the space formed at in-wheel motor 70 on the vehicle body side is narrowed.

Accordingly, the present embodiment employs a structure where ring gear 85 has its rotation shaft direction end face abutted to case 60a, and the rotation shaft direction position of ring gear 85 is fixed by case 60a. Thus, as assembling of the snap ring is not required, the length of in-wheel motor 70 in the rotation shaft direction can be reduced. As a result, the space formed at in-wheel motor 70 on the vehicle body side is enlarged, whereby the assembly position of shock absorber 230 to lower arm 220 can be moved toward wheel disc 10.

Here, in lower arm 220, a ratio (=AL1/AL) of a distance AL1 between a fixing position to the vehicle body (corresponding to rotary center of lower arm 220) and an assembling position of shock absorber 230 and a distance AL between a fixing position of the vehicle body and a coupling position to motor-driven wheel 100 (corresponding to the arrangement position of ball joint 170) is referred to as an arm ratio. As the arm ratio is greater, that is, as distance AL1 is longer, the absorption efficiency of the vibration of motor-driven wheel 100 in the suspension is higher.

In in-wheel motor 70 according to the present invention, shock absorber 230 can be moved toward wheel disc 10 as in-wheel motor 70 is reduced in size in the rotation shaft direction by the above described third characteristics. In other words, distance AL1 can be increased. Thus, the arm ratio in lower arm 220 is increased, and the riding comfort of the vehicle is further improved.

As above, according to the present invention, the in-wheel motor that is small in size and weight and that has high durability can be implemented. Additionally, the suspension can be improved to improve the riding comfort of the vehicle.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An in-wheel motor, comprising:
   an electric motor generating motive power;
   a speed reducer arranged toward a wheel relative to said electric motor to reduce an output of said electric motor;
   a rotation shaft arranged toward said wheel relative to said speed reducer to transmit an output of said speed reducer to said wheel; and
   a case accommodating said electric motor and said speed reducer, wherein said case includes a first case arranged toward a vehicle body to fix said electric motor and said speed reducer, and a second case arranged toward said wheel to be coupled to said first case at a face perpendicular to said rotation shaft, and wherein said second case abuts to an end face, perpendicular to said rotation shaft, of said speed reducer to fix said speed reducer in said rotation shaft direction,
   wherein said rotation shaft is connected to a motive power transmission mechanism transmitting said motive power to said wheel, and
   wherein said case is connected to knuckle via spring, and said knuckle rotatably supports said wheel, and said case is coupled to said knuckle by torque rod.

2. The in-wheel motor according to claim 1, wherein said speed reducer is formed by a planetary gear mechanism, and wherein said planetary gear mechanism includes a sun gear coupled to a rotor of said electric motor, a pinion gear arranged to engage with said sun gear, a planetary carrier that is coupled to said pinion gear and that is connected to said rotation shaft, and a ring gear that is non-rotatably fixed.

3. The in-wheel motor according to claim 1, wherein said second case abuts to an end face, perpendicular to said rotation shaft, of said ring gear.

* * * * *

UNITED STATES PATENT AND TRADEMARK OFFICE
CERTIFICATE OF CORRECTION

PATENT NO. : 7,641,010 B2  Page 1 of 1
APPLICATION NO. : 11/304638
DATED : January 5, 2010
INVENTOR(S) : Mizutani et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1023 days.

Signed and Sealed this

Sixteenth Day of November, 2010

David J. Kappos
*Director of the United States Patent and Trademark Office*